United States Patent [19]

Vautour

[11] Patent Number: 5,096,026
[45] Date of Patent: Mar. 17, 1992

[54] DOUBLE-ACTING HYDRAULIC PISTON

[76] Inventor: Gilles Vautour, P.O. Box 2043, Station A, Moncton, New Brunswick, Canada, E1C 8H7

[21] Appl. No.: 583,116

[22] Filed: Sep. 17, 1990

[51] Int. Cl.⁵ .............................................. F16F 9/18
[52] U.S. Cl. .................................. 188/314; 188/311; 272/130
[58] Field of Search ................... 188/312, 311, 322.22, 188/281, 279, 283, 284, 285, 314, 317; 272/130, 72

[56] References Cited

U.S. PATENT DOCUMENTS

| | | | |
|---|---|---|---|
| 2,804,513 | 8/1957 | Oppel | 188/314 X |
| 2,853,159 | 9/1958 | Kuhn, Jr. | 188/314 |
| 4,662,486 | 5/1987 | Stenberg | 188/312 |
| 4,667,955 | 5/1987 | Giesch | 272/130 |
| 4,689,849 | 9/1987 | Eger et al. | 188/318 X |
| 4,928,799 | 5/1990 | Zschiesche | 188/314 |

FOREIGN PATENT DOCUMENTS 1512602 10/1989 U.S.S.R. ............................... 272/130

Primary Examiner—Matthew C. Graham
Assistant Examiner—Peter M. Poon
Attorney, Agent, or Firm—Joseph A. Day

[57] ABSTRACT

A double-acting hydraulic piston comprises a cylinder which has a first piston disposed therein in such a manner as to divide the cylinder into first and second fluid chambers. The first piston is attached to a shaft which extends through one end of the cylinder and is reciprocable within the cylinder. The first and second fluid chambers are connected to each other by a connecting mechanism so that fluid is able to pass from the first chamber to the second chamber, and visa versa, as the first piston is reciprocated within the cylinder. A second piston is disposed within the connecting mechanism. The second piston has a passage therethrough to allow for transfer of fluid from one fluid chamber to the other as the first piston is reciprocated within the cylinder. The second piston moves in response to movements of the first piston, thereby effectively altering the capacity of the first and second fluid chambers to accommodate fluid as it is forced from one fluid chamber to the other by the movement of the first piston. A mechanism is provided to compensate for the change in the length of the shaft as the first piston is reciprocated within the cylinder. The double-acting hydraulic piston is operable in both the "push" and "pull" directions.

1 Claim, 3 Drawing Sheets

DOUBLE-ACTING HYDRAULIC PISTON

BACKGROUND OF THE INVENTION

This invention relates generally to a double-acting hydraulic piston, and more specifically to a double-acting hydraulic piston for use in exercise and weight lifting equipment.

SUMMARY OF THE INVENTION

The device of the present invention comprises a cylinder which has a first piston disposed therein in such a manner as to divide the cylinder into first and second fluid chambers. The first piston is attached to a shaft which extends through one end of the cylinder and the first piston is reciprocable within the cylinder. The first and second fluid chambers are connected to each other by a connecting means, so that fluid is able to pass from the first fluid chamber to the second fluid chamber, and visa versa, as the first piston is reciprocated within the cylinder. A second piston is disposed within the connecting means. The second piston has a passage therethrough to allow for transfer of fluid from one fluid chamber to the other as the first piston is reciprocated within the cylinder. The second piston moves in response to movements of the first piston, thereby effectively altering the capacity of the first and second fluid chambers to accommodate fluid as it is forced from one fluid chamber to the other by the movement of the first piston. The second piston acting as a means to hinder flow of fluid between the first and second fluid chambers so as to require the application of force to move fluid between the first and second fluid chambers.

A tube is mounted within the connecting means and the second piston is slidably receivable on the tube. A space is defined around the tube and lying between the circumference of the connecting means and the circumference of the tube. The connecting means has an air-hole disposed therein in such a manner that air is either evacuated or drawn into this space as the second piston moves within the tube. A spring with a very light tension is attached to the second piston at one end and to the tube at the other end to keep the second piston urged against the fluid in the connecting means. A flange may be provided on the tube to limit the extent of travel of the second piston on the tube. A mechanism to restrict the flow of fluid through the connecting means may also be provided. The piston is adapted to be operable in both the "push" and "pull" directions.

In a preferred embodiment of the invention, the device comprises first and second cylinders which are connected to each other by first and second connecting tubes. A first piston is disposed within the first cylinder and a second piston is disposed within the second cylinder. The first piston is attached to a shaft which extends through one end of the first cylinder. The second piston is adapted to move within the second cylinder in response to movements of the first piston within the first cylinder. The first and second cylinders are effectively divided into first and second fluid chambers by the two pistons. The second piston has a passage therethrough which allows fluid to be transferred from one fluid chamber to the other as the first piston moves within the first cylinder. The first fluid chamber is that area of the device disposed in the first cylinder between the first piston and the end of the cylinder through which the shaft extends, the first connecting tube, and that area of the second cylinder between the end of the second cylinder and the second piston. The second fluid chamber is that area of the device disposed between the first piston and the opposite end of the first cylinder to that through which the shaft extends, the second connecting tube, and that area of the second cylinder between the other end of the second cylinder and the second piston.

BRIEF DESCRIPTION OF THE DRAWINGS

The preferred embodiment of the invention will now be described with the aid of the following drawings in which.

DETAILED DESCRIPTION OF THE PREFERRED EMBODIMENT

Figure 1:
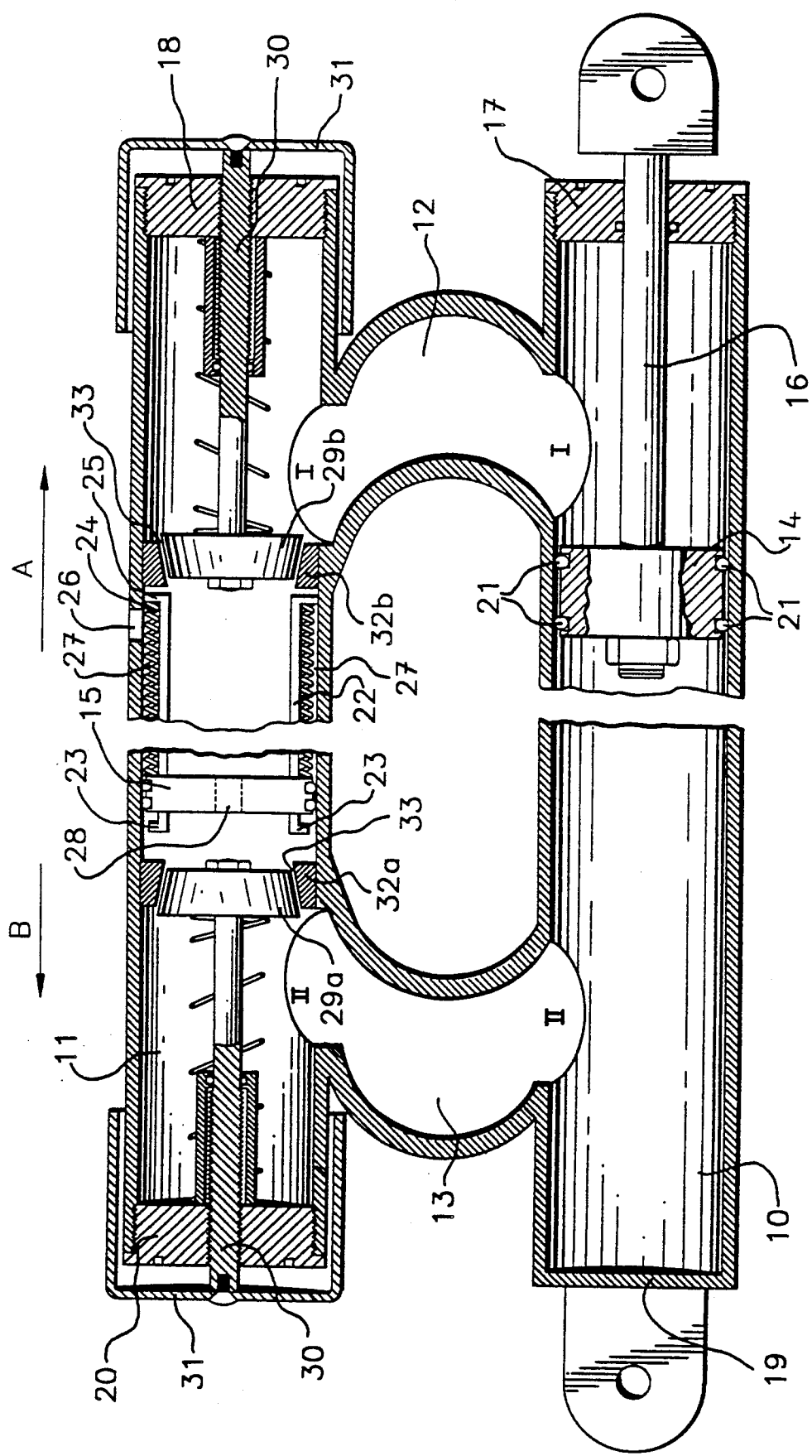
FIG. 1 is a side view of a double-acting hydraulic piston in accordance with the present invention.
Figure 2:
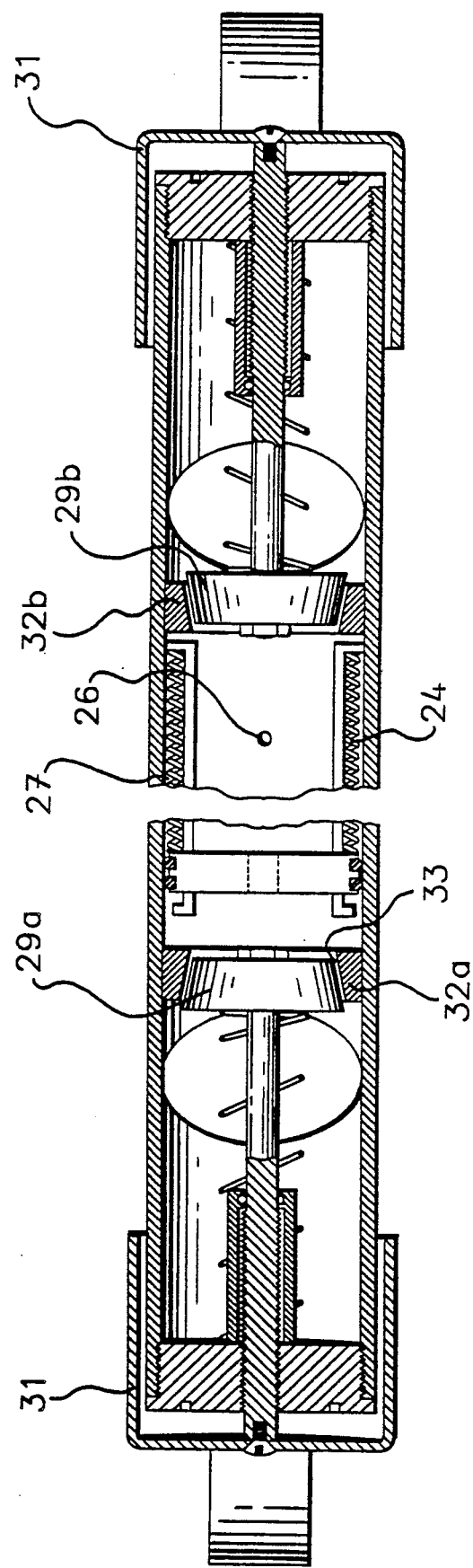
FIG. 2 is a plan view of the device of FIG. 1.

Referring to FIG. 1, the device of the present invention comprises a first cylinder 10 and second cylinder 11 which are connected to each other by first and second connecting tubes 12, 13. A first piston 14 is disposed within the first cylinder 10 and a second piston 15 is disposed within the second cylinder 1. The first piston 14 is attached to a shaft 16 which extends through one end 17 of the first cylinder 10. The shaft 16 may be connected to suitable exercise or weight-lifting equipment (not shown). The first and second cylinders 10, 11 and first and second connecting tubes 12, 13 make up first and second fluid chambers I, II. The first fluid chamber I is that area of the device between the end 17 of the fist cylinder and the first piston 14, the first connecting tube 12 and the area of the second cylinder 11 lying between the end 18 of the second cylinder and the second piston 15. The second fluid chamber II is that area of the device between the first piston 14 and the end 19 of the first cylinder opposite that through which the shaft 16 extends, the second connecting tube 13, and that area of the second cylinder 11 which lies between the second piston 15 and the other end 20 of the second cylinder 11.

The first piston 14 is slidably received within the first cylinder 10 and is adapted to reciprocate within the first cylinder 10. O-rings 21 are provided to prevent leakage of fluid around the first piston 14 from first fluid chamber I to second fluid chamber II and visa versea.

A tube 22 is mounted within the second cylinder 11 as shown in FIG. 1, and the second piston 15 is slidable thereon. The tube has a flange 23 which limits the travel of the second piston. Springs 24 are attached to one end 25 of the tube 22 and to the second piston 15. The springs 24 assist in urging the second piston against the fluid in the second cylinder 11. An air-hole 26 is provided to evacuate air from the space 27 formed between the tube 22 and the second cylinder 11 when the second piston is moved in the direction of arrow A as shown in FIG. 1 in response to the first piston 14 being moved in the direction of arrow B. When the first piston 14 is moved in the opposite direction, air enters the space 27 through the air-hole 26.

A passage 28 is provided in the second piston 15 to allow for transfer of fluid therethrough from one fluid chamber to the other in response to movement of the first piston 14.

Means are provided to restrict the flow of fluid between the first and second fluid chambers I, II. In the preferred embodiment of the invention, the means to restrict flow comprises a set of adjustable valves 29a, 29b, one valve being mounted on each side of the second piston 15. The valves 29a, 29b, are connected to rods 30 which are connected to the adjustments 31. The adjustments 31 may be adjusted by hand to move the valves 29a, 29b towards or away from the shoulders 32a, 32b. The movement of the valves 29a, 29b changes the size of the gap 33 between the valves and the shoulders which in turn changes the rate of flow of the fluid between fluid chambers I and II. The restriction of rate of fluid flow through the second cylinder II changes the amount of force which the user has to apply to the shaft 16 in order to move the first piston 14 within the first cylinder 10. While valves 29a, 29b are used in the present invention, any other suitable flow-restricting means may be used in this device.

Suitable stop means (not shown) may be provided in the first cylinder 10 to limit the extent of travel of the first piston 14 within the first cylinder 10 to ensure that a completed fluid circuit is maintained within the device during its operation.

Figure 3:
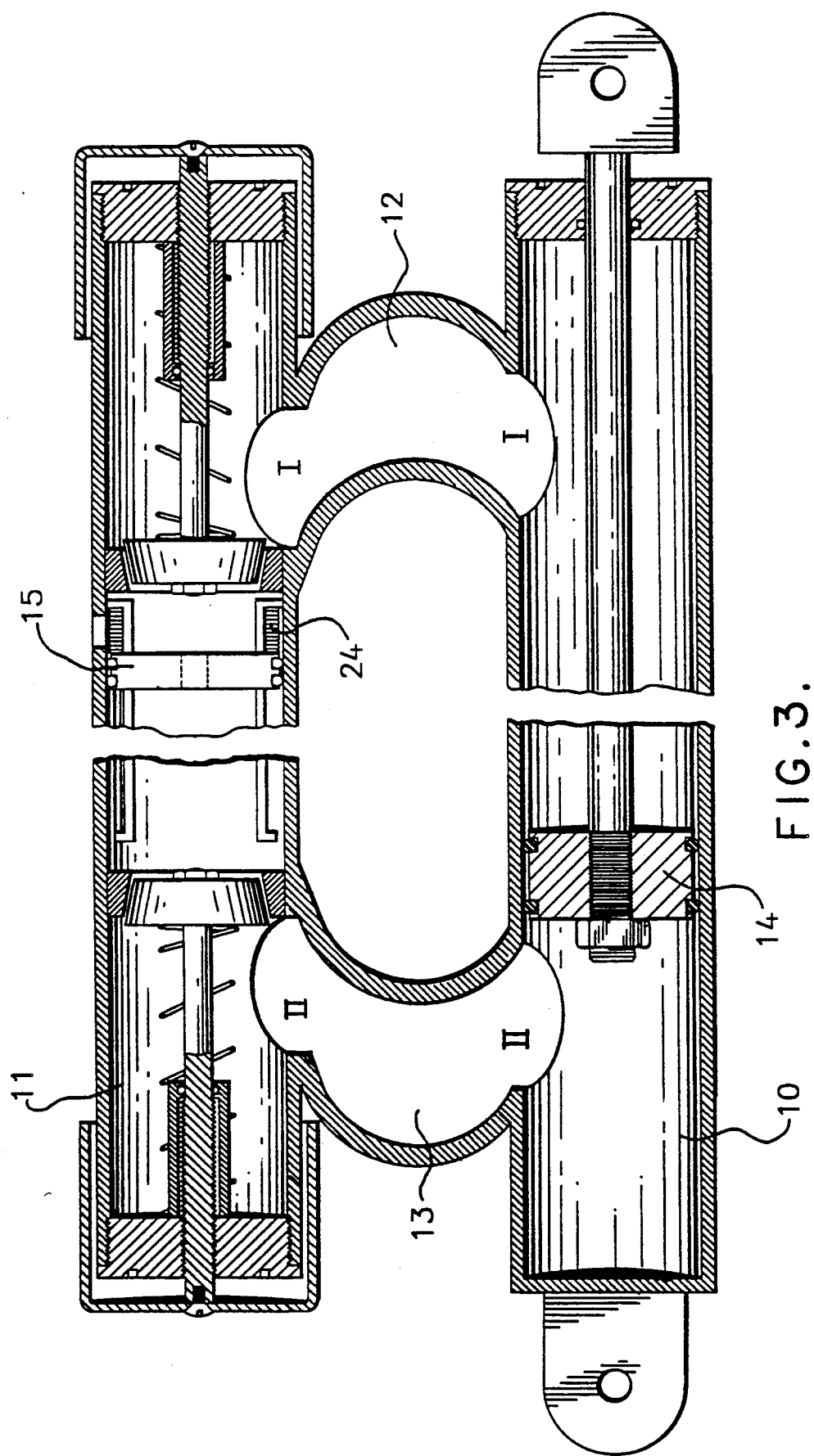
FIG. 3 is a side view of the device of FIG. 1, where the first piston has been moved in a direction away from the end of the first cylinder through which the shaft extends.

Referring to FIGS. 1 and 3, the device functions in the following manner:

When the shaft 16 is moved in the direction of Arrow B, the first piston 14 moves towards the left as shown in FIG. 1. This forces fluid out of the first cylinder 10, through the second connecting tube 13 and into the second cylinder 11. Fluid is then forced through the gap 33 between the valve 29a and the shoulder 32a. The influx of fluid acts on the second piston 15 moving it towards the right as shown in FIG 1. Fluid flows through the passage 28 in the second piston 15 and into the first fluid chamber I. As the second piston 15 moves towards the right, air is evacuated from the space 27 through the air hole 26, thereby compensating for the increase in length of the shaft 16 in the fist cylinder 10.

When the shaft 16 is moved in the direction of A in FIG. 1, fluid is forced from the first cylinder 10, through the first connecting tube 12 and into the second cylinder 11. Fluid flows through the gap 33 between valve 29b and shoulder 32b, and acts on the second piston 15 forcing it towards the left in FIG. 1. Fluid flows through the passage 28 in the second piston and into the second fluid chamber II. As the second piston 15 moves towards the left, air is sucked into the space 27 through the air-hole 26, thereby compensating for the loss of some length of the shaft 16 in the first cylinder 10.

As can be seen from the above, the hydraulic piston is operable in both the "push" and "pull" directions, making it suitable for such devices as exercise and weightlifting equipment.

Variations in the present invention will be obvious to those skilled in the art, and all such obvious variations are contemplated to fall within the scope of the present invention.

The embodiments of the invention in which an exclusive property or privilege as claimed are defined as follows:

1. A double-acting hydraulic piston comprising:
   a cylinder containing fluid;
   a first piston disposed within the cylinder in such a manner as to divide the cylinder into first and second fluid chambers; said first piston being attached to a shaft which extends through one end of the cylinder and being adapted to reciprocate within the cylinder;
   connecting means for connecting the first and second fluid chambers to each other so that fluid is able to pass from the first fluid chamber to the second fluid chamber and visa versa, as the first piston is reciprocated within the cylinder;
   a second piston disposed within said connecting means; said second piston having a passage threrethrough to allow for transfer of fluid through the second piston in response to movement of the first piston within the cylinder; said second piston being movable within the connecting means in response to movement of the first piston to effectively change the capacity of the first and second chambers;
   said second piston acting as a means to hinder flow of fluid between the first and second fluid chambers so as to require the application of force to move fluid between the first and second fluid chambers;
   a tube mounted within the connecting means, said second piston being slidably receivable on said tube, and wherein a space is defined around said tube, said space lying between the circumference of the connecting means and the circumference of the tube, and where the connecting means has an air hole disposed therein in such a manner that the air is either evacuated or drawn into the space as the said second piston moves on the said tube.

* * * * *